Sept. 19, 1944. G. FROVA 2,358,500
APPARATUS FOR DECLUSTERING, DISTRIBUTING AND ASSORTING CHERRIES
Original Filed June 30, 1942 4 Sheets-Sheet 1
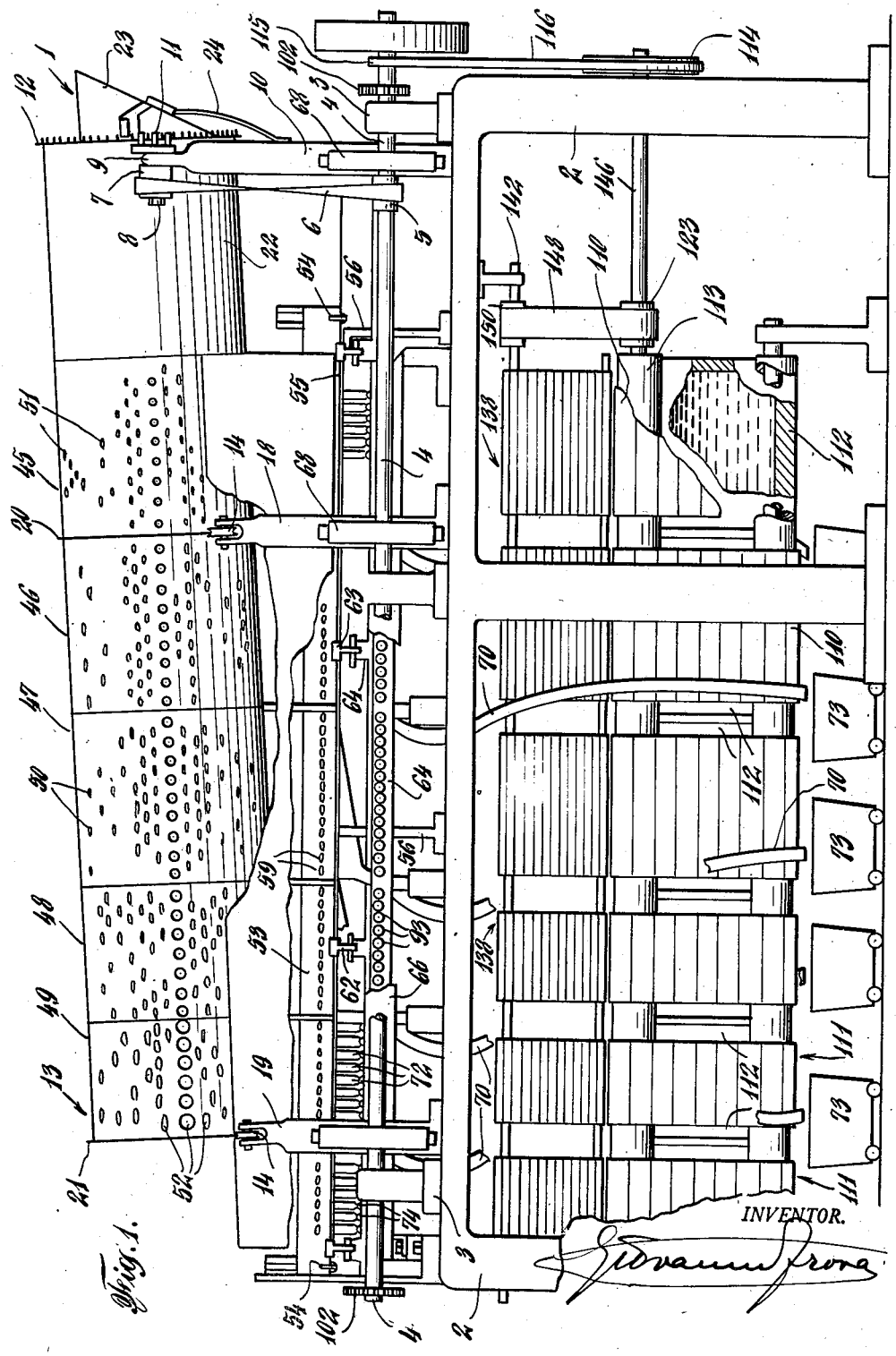

Sept. 19, 1944. G. FROVA 2,358,500
APPARATUS FOR DECLUSTERING, DISTRIBUTING AND ASSORTING CHERRIES
Original Filed June 30, 1942  4 Sheets-Sheet 2
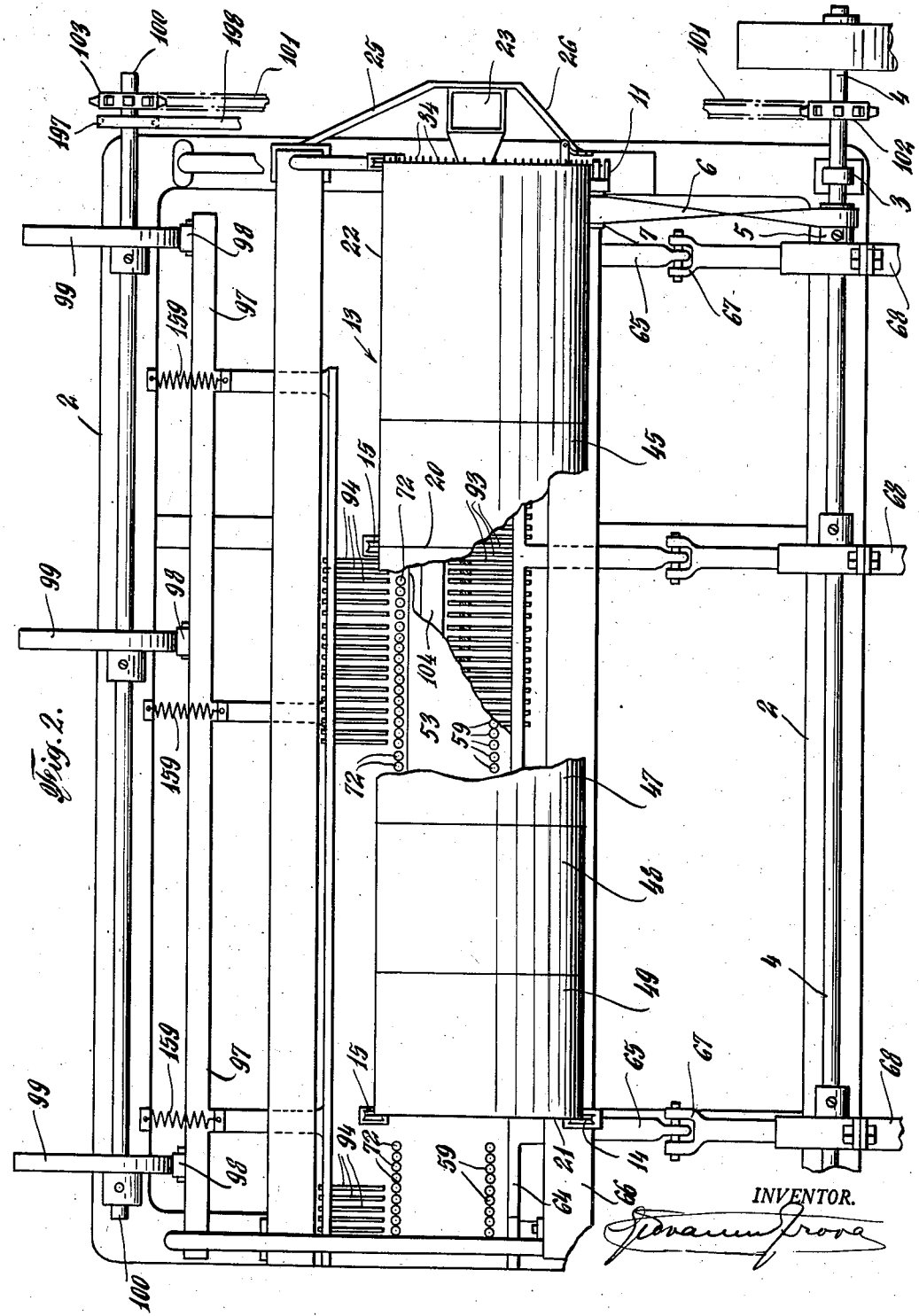
INVENTOR.

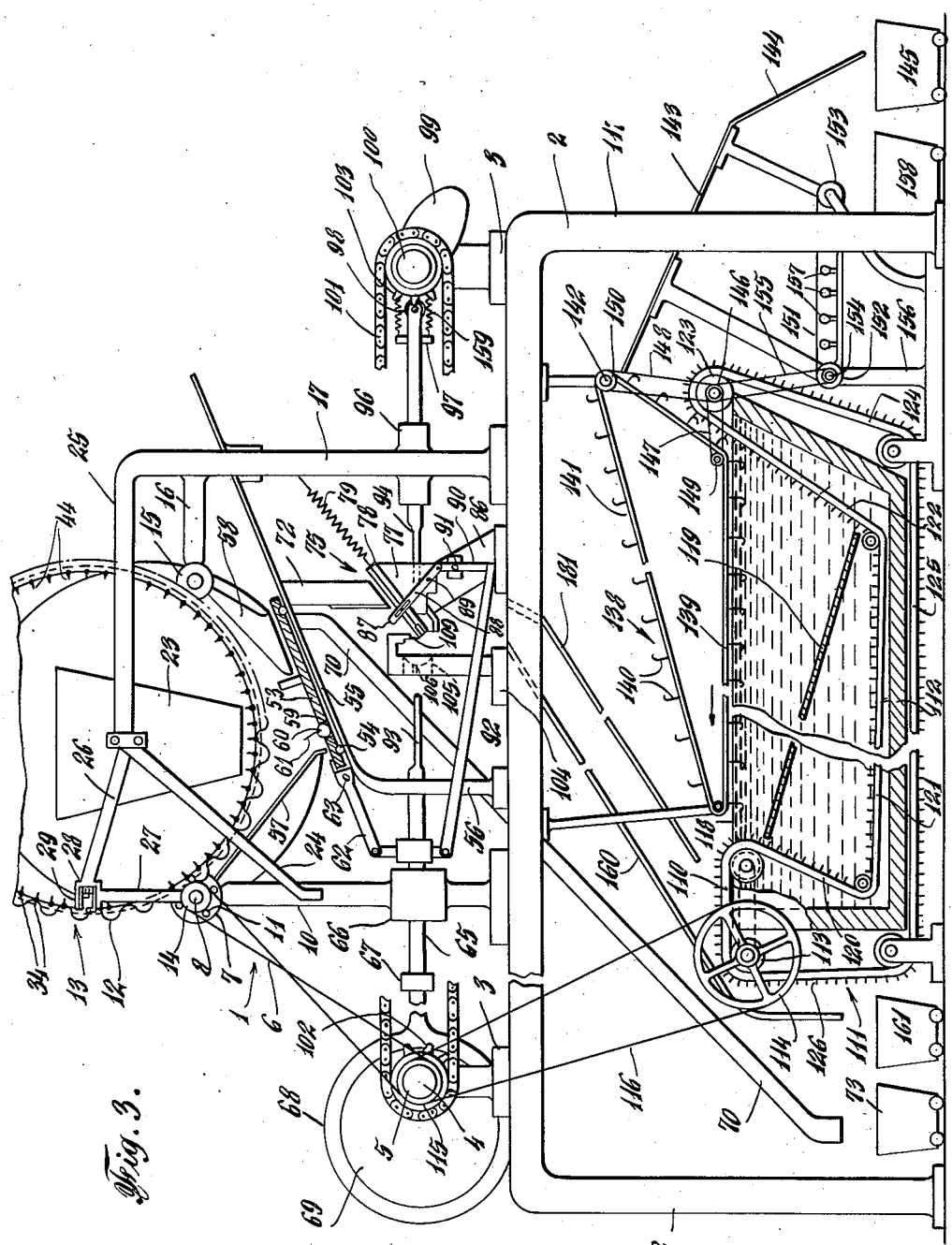

Sept. 19, 1944. G. FROVA 2,358,500
APPARATUS FOR DECLUSTERING, DISTRIBUTING AND ASSORTING CHERRIES
Original Filed June 30, 1942 4 Sheets-Sheet 4
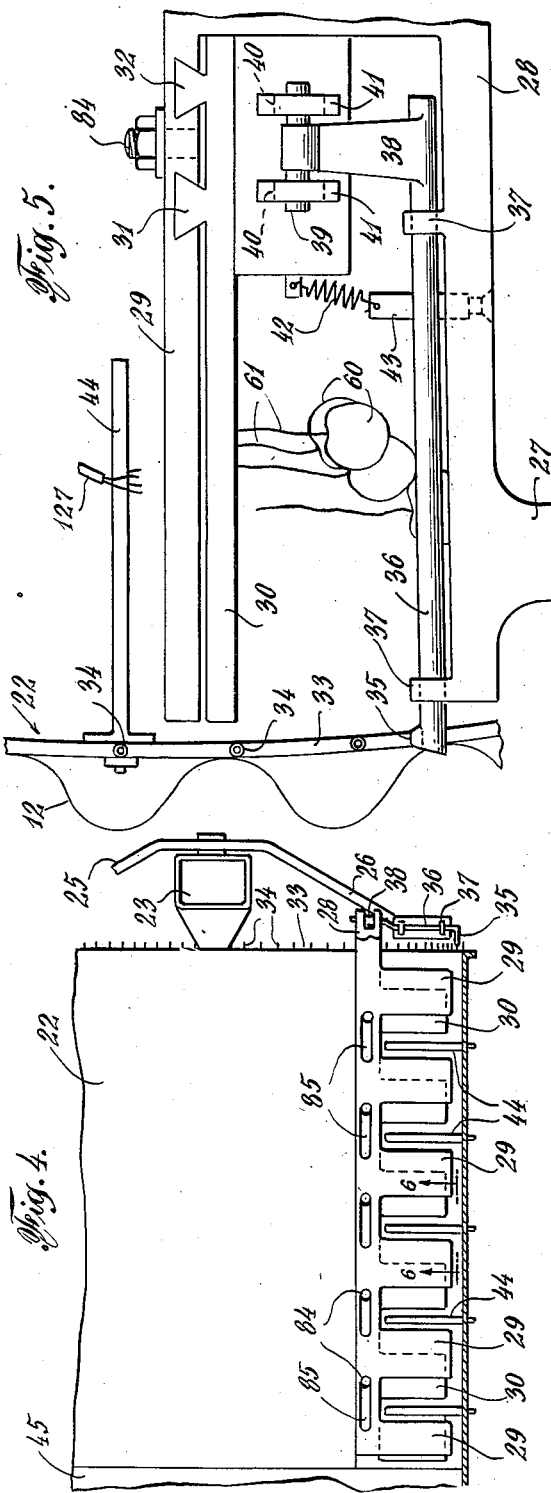
INVENTOR.

Patented Sept. 19, 1944

2,358,500

UNITED STATES PATENT OFFICE 2,358,500

APPARATUS FOR DECLUSTERING, DISTRIBUTING, AND ASSORTING CHERRIES

Giovanni Frova, Jackson Heights, N. Y.

Original application June 30, 1942, Serial No. 449,116. Divided and this application February 22, 1943, Serial No. 476,701

8 Claims. (Cl. 146—27)

This is a division of my copending application filed June 30, 1942, with Serial No. 449,116.

This invention relates to apparatus for de-clustering, distributing and assorting cherries and the like.

The main object of my invention is to provide an efficiently combined apparatus capable of receiving cherries in clusters, for example, and not only separating the cherries in each cluster but using the individual stems of the separated cherries to dispose the latter by an intermediate operation in proper position for pitting out through the stem end of each cherry.

A further object is to have a compact apparatus for the present purpose which requires a minimum of attendants and occupies a minimum amount of floor space, while requiring a minimum outlay of funds for a maximum output of pitted and sorted cherries or other product of this class.

Other objects and the advantages of my invention and its actual use in practice will appear more fully in detail as this specification proceeds.

In order to bring out the salient features of the invention in comprehensible manner and to the best advantage, the same is illustrated in the accompanying drawings forming part hereof, in which:

Fig. 1 is a side elevation of a machine embodying the invention in practical form and exhibiting the features and advantages thereof.

Fig. 2 is a top plan view of the same.

Fig. 3 is an end elevation of the machine as seen from the right in Fig. 1.

Fig. 4 is an enlarged fragmentary sectional view of the right end or de-clustering portion of the drum surmounting the apparatus of Fig. 1.

Fig. 5 is a further enlarged view of a portion of the same apparatus shown in Fig. 3, illustrating one of a plurality of devices for catching and separating a cluster of cherries, preparatory to grading of the cherries in succeeding sections of the drum.

Fig. 6 is a detail section taken on line VI—VI in Fig. 4.

Fig. 7 is an enlarged fragmentary detail view of a feeder of the upper central portion of Fig. 3 with some parts removed and others in section to disclose the essential parts in initial position, with a cherry in place as first deposited, as partly fed forward and then finally released.

Throughout the views, the same references indicate the same or like parts.

In the fruit and berry handling art, and particularly in apparatus for handling such berries and fruits as cherries and the like, certain operations have heretofore been carried out by hand and while others have been effected by separate machines. This has entailed repeated rehandling of the cherries at various stages and the use of a considerable number of attendants. This involves expense, inconvenience, and the use of a great amount of floor space, all of which greatly increases the cost of the final product.

In order to overcome these disadvantages, and particularly with the foregoing objects in view it is now proposed to carry out in a combined machine the entire group of operations required to put and deliver cherries and the like from the original clusters.

Hence, referring now again to the drawings in Figs. 1 to 5, a fruit or berry handling machine, generally indicated at 1 has a main frame 2 upon which are fixed bearings 3, 3 for a main drive shaft 4 (driven by a motor or other means not shown) having a pulley 5 fixed thereon and connected by a belt 6 to a pulley 7 on one end of a second shaft 8 supported in bearing 9 on post 10 secured on the frame 2. On the other end of this shaft 8 is fixed a stud pinion 11 meshing with a ring gear 12 on the periphery at one end of a grading or distributing drum generally indicated at 13. This drum is supported in inclined position upon a group of grooved rollers 14, 15, etc., carried on an arm 16 on a second post 17 and on further supports 18, 19, etc., on the machine frame, the drum having spaced peripheral rails 20, 21, etc., riding in the grooves of the rollers and thereby locating said drum in position while allowing the same to rotate on said rollers.

Forming the first or introductory portion of drum 13 is a de-clustering section 22 which is located at the higher end of the drum, immediately within a hopper 23 supported closely adjacent said end of the drum by a bracket 24 secured to post 10 and by an extension 25 upon the second post 17 already mentioned.

A further bracket 26 extends from the hopper toward the edge of the drum and meets with an upward extension 27 upon post 10 in order to support a stationary bracket 28 which has an upper cutting blade 29 extending horizontally toward the periphery of the drum and a movable knife or cutter 30 dove-tailed at 31, 32 to the first blades so as to be slidable with respect to the same in the axial direction of the drum. In order to operate the cutter constituting this construction, the edge 33 of the de-clustering portion of the drum has a series of projections 34, 34 which during rotation of the drum as a whole engage with a finger 35 fixed on a rocking shaft 36 mounted in bearings 37, 37 on bracket 28 and carrying at the other end an arm 38 having a pin 39 projecting into vertical slots 40, 40 in the lugs 41 fixed to the lower portion of the cutter or blade 30. When the cutter has been operated in one direction to cooperate with the upper cutter 29 so as to shear off the branch connection between the stems in the cluster of cherries by contact of finger 35 with a drum projection 34, a return spring 42 attached to the lower portion of plate 30 at one end and at the other end to a post 43 on bracket 28 will cause the cutters to separate ready for the next cutting operation. As best seen in Fig. 4, each cutter member 29, 30 is comb-shaped to form a multiple cutter, the movement being limited by, and the cutters further retained in association by retaining studs 84 on the lower fixed multiple cutter plate 30 extending up through operating slots 85 in the upper movable cutter member 29.

In order to cooperate with the cutters, a group of rigid arms 44 extend radially inward from the interior of the de-clustering section of the drum and are so disposed that each group is arranged along a line upon the drum in parallelism with the axis thereof within each one of the projections 34. These arms serve to pick up individual clusters of cherries and expose the stems of the same at the proper moment to the cutters 29 and 30 when they are temporarily open, so that the connection between the stems in each cluster will be snipped off by the closing of the cutters. When the stems of the cherries have thus been separated, the latter with their individual stems intact will gradually feed down along the grading sections 45 to 49, due to the rotation of the latter and slight inclination of the same, so that the cherries will travel within said drum until the section is reached wherein the holes 50, etc., are sufficiently large to allow these cherries to drop through. As grading drums for various purposes are well known, it will suffice to mention that in this section 45 the holes 51 are the smallest in the series, while the holes or apertures in the succeeding sections are increasingly larger with the holes 52 in section 49 largest of all. It may be added that the apertures in the grading sections are, of course, placed all about the drum so that the fruit dropping through the same will be distributed and fall upon a series of predetermined points of a slidable reciprocating feed plate 53 having rollers 54 resting upon a supporting plate 55 supported upon posts 56 and 17. Below the drum an apron 57 and a stem retainer 58 have the upper surfaces inclined in converging manner generally toward the initial location of row of apertures 59 in the feed plate serving to catch falling cherries 60 therein. It may be stated that always the cherries 60 will fall in such position that when they drop into apertures 59 in the mentioned feed plate their stems 61 will be directed generally upward. To the lower end of the feed plate is connected a link 62 at 63 which in turn is connected to and driven by a bar 64 fixed upon a sliding shaft 65 supported in a bearing 66 in post 10 while a cross head 67 connects said shaft with an eccentric ring 68 mounted upon an eccentric 69 fixed on drive shaft 4.

From the foregoing it is clear that upon rotation of the drive shaft the eccentric 69 will cause shaft 65 to reciprocate in bearing 66, and thus through bar 64, and link 62, drive the feed plate 53 upwardly along the support 55 until apertures 59 will register with the upper end of a row of tubes 70 which open in predetermined position through support plate 55. However, when the cherries have been brought part of the distance toward these tubes, the stems thereof will make contact with an entrance portion beneath stem retainer 58 which will tend to turn down the stem due to the movement of the feed plate 53 and wipe said stems under said stem retainer, so that each cherry that has a stem is virtually suspended upon the feed plate by the stem above the corresponding tube 70 during movement of this feed plate until said plate has moved the cherry beyond said tube 70 to one of a series of rear feed tubes 72. Any excess cherries upon the plate above the one deposited in cherry aperture 59 will be brushed off by the downwardly directed brushes 71 (Fig. 7) mounted at the entrance portion of the stem retainer, and due to the sharp inclination of the feed plate, such excess cherries will roll back to the initial position of the cherry aperture, ready to drop into the same during a succeeding cycle of operation of the feed plate. The cherries having stems will thus be carried by the feed plate past tube 70, but should any cherry have lost its stem, the stem retainer 58 will not operate to suspend the cherry in the aperture 59, but said cherry will instead drop from said aperture down through tube 70 to a collector 73 below the machine. At a point approximately above tube 70, the stem retainer terminates so that when the cherries which have been carried past tube 70 reach tube 72, the stem retainer no longer retains the stems lying upon feed plate 53, but frees the same so that these cherries may drop individually in said tubes 72, down into individual troughs or the like in a trough member 77 for further operations, as more fully set forth in my copending application, Serial No. 476,702, filed February 22, 1943.

Following the operation, from the hopper 23 onward, it may be assumed that a more or less continuous supply of clusters of cherries are fed to the hopper whence the clusters feed in by gravity from said hopper 23 to the interior of the de-clustering section 22 of the grading drum 13, the latter being rotated clockwise in Figure 3. The clusters are picked up by the inwardly extending pins or arms 44 and as each cluster is caused to pass the bracket 28 and the cutters 29 and 30, the cutter 30 being operated through arm 38, rocking shaft 36 and contact of finger 35 on said shaft with projection 34 on the drum.

As shown in Figure 5 the connecting branch portion 127 of the cherries 60 will be cut off from the stems 61 while said branch portion is momentarily held on the arm 44 when the cherries will drop to the drum in separated condition. These cherries then gradually roll inward from the de-clustering section into the grading sections 45 to 49 to drop through the apertures 50, 51, and 52 as the case may be according to their sizes, and thence into the apertures 59 of feed plate 53 reciprocated from eccentric 69 through bar 64 and link 62, when these cherries will be passed to and drop into feed tubes 72 and deposited individually in troughs or the like in trough member 77 previously referred to and fully disclosed in said copending application.

Manifestly other variation may be resorted to, such as for example, the different sizes and shape of cutters for de-clustering and different forms of arms upon the de-clustering section of the drum, etc., may be adapted to suit conditions.

Having now fully described my invention, I claim:

1. Automatic apparatus for de-clustering or separating the stems of individual cherries in a cluster, including the combination of a rotatable drum having a plurality of spaced arms projecting radially inward from the inner wall thereof, the drum being adapted for receiving clusters of cherries and the like in the interior thereof, there being means for driving said drum, cutting means disposed in an effective position to cut the cluster stems apart when the inwardly extending arms by rotation of the drum are brought up substantially to horizontal position at one side with the clusters pendently carried by their stems upon said arms, means for supporting the cutting means, and means for operating said cutting means during rotation of said drum, the means for operating the cutting means including a plurality of end projections spaced apart upon the end portion of the drum, a rocking shaft transversely disposed with respect to the axis of said drum, a finger upon one end of said rocking shaft in the path of said projections and caused to move by each projection in succession so as to rock or partly rotate said shaft, and an arm mounted upon the other end of the shaft and connected to a cutting member of the cutting means for operating the same upon rocking of said shaft.

2. Automatic apparatus for de-clustering or separating the stems of individual cherries in a cluster, including the combination of a rotatable drum having a plurality of spaced arms projecting radially inward from the inner wall thereof, the drum being adapted for receiving clusters of cherries and the like in the interior thereof, there being means for driving said drum, cutting means disposed in an effective position to cut the cluster stems apart when the inwardly extending arms by rotation of the drum are brought up substantially to horizontal position at one side with the clusters pendently carried by their stems upon said arms, means for supporting the cutting means, and means for operating said cutting means during rotation of said drum, the cutting means and the means for operating the same including a group of operating members upon the drum, a cutter shaft mounted adjacent to the end of said drum, an engagement means on one portion of said shaft disposed in a position to engage with and be operated by said operating members so as to operate said shaft, a movable cutter member, an arm upon the shaft connected to said cutter member and capable of operating the same, the support means upon the machine supporting both the shaft and cutter member, and a second cutter member fixed on said support means in a position to cooperate with the first mentioned cutter member and the inwardly extending arms being arranged in rows corresponding to the positions of said operating members and disposed in effective positions to bring the branch portions of cherry clusters between said cutter members when the operating members are about to operate said cutter members through said engagement means, shaft and arm.

3. Apparatus for handling fruits and berries such as cherries, and separating the fruit without stems from those with stems, including a rotatable distributing drum, support means and drive means for the same, an inclined plate support beneath said drum, a feed plate slidable on said plate support for receiving the fruit descending from said drum and having fruit receiving apertures therein, reciprocating means connecting said feed plate to said drive means for reciprocating the plate from a lower receiving position to a higher delivery position, said supporting plate having two spaced groups of delivery apertures with which the receiving apertures in the feed plate register in succession, two groups of fruit delivery means connected independently to said two groups of apertures, and means causing the fruit without stems to drop through said feed plate into the first group of delivery apertures and the delivery means connected thereto when the receiving apertures in the plate register with said first apertures and causing the fruit with stems to remain in said receiving apertures while they pass over said first group of delivery apertures and then drop through the feed plate into the delivery apertures of the second group and into the delivery means connected thereto.

4. Apparatus according to claim 3, wherein the means causing the fruit with stems to pass the first group of delivery apertures includes a stationary stem retainer located above the feed plate and spaced a small distance from the same in parallelism with the upper surface thereof so as to hold fruit stems down toward the plate during movement of the latter past the first group of delivery apertures in said supporting plate, said retainer extending only a limited distance over the path of movement of said plate and terminating at a point which frees the stems in time to allow the fruit to drop from the plate into the second group of delivery apertures.

5. Apparatus according to claim 3, wherein the means causing the fruit with stems to pass the first group of delivery apertures includes a stationary stem retainer located above the feed plate and spaced a small distance from the same in parallelism with the upper surface thereof so as to hold fruit stems down toward the plate during movement of the latter past the first group of delivery apertures in said supporting plate, said retainer extending only a limited distance over the path of movement of said plate and terminating at a point which frees the stems in time to allow the fruit to drop from the plate into the second group of delivery apertures, said stem retainer having an inclined entrance portion and upon said portion brush means for returning excess cherries from off the receiving apertures on the feed plate.

6. Apparatus for separating the stems of individual cherries in a cluster, and separating the cherries with stems from those having no stems, including a rotatable distributing drum having a plurality of spaced arms projecting radially inward from the inner wall thereof, said drum being adapted to receive clusters of cherries and the like within the interior of the same, there being means for rotatably supporting said drum and means for driving the latter, cutting means disposed in a position to cut the cluster stems apart when the inwardly extending arms by rotation of the drum are brought up to substantially horizontal position at one side with the clusters pendently carried by their stems upon said arms, means for supporting the cutting means, and means for operating said cutting means during rotation of said drum, an inclined plate support for receiving the fruit descending from said drum and having fruit receiving apertures therein, reciprocating means connecting said feed plate to said drive means for reciprocating the plate from a lower receiving position to a higher delivery position, said supporting plate having two spaced groups of delivery apertures with which the receiving apertures in the feed plate register in succession, two groups of fruit delivery means connected independently to said two groups of apertures, and means causing the fruit without stems to drop through said feed plate into the first group of delivery apertures and the delivery means connected thereto when the receiving apertures in the plate register with said first apertures and causing the fruit with stems to remain in said receiving apertures while they pass over said first group of delivery apertures and then drop through the feed plate into the delivery apertures of the second group and into the delivery means connected thereto.

7. Apparatus for separating cherries having stems from stemless cherries, including a fixed plate supporting means, a feed plate movably mounted upon said plate supporting means in a position to receive cherries with and without stems upon the same, said plate having fruit receiving apertures therein, means for reciprocating said feed plate, from one to another position, two groups of delivery means spaced apart beneath said feed plate with which the apertures in said feed plate register in succession, means causing the cherries with stems to remain in the apertures in the feed plate when the latter register with one group of said delivery means beneath the plate and causing the cherries without stems to drop from the plate apertures into said delivery means of said one group, and causing the cherries with stems to drop with the stems directed upwards into the delivery means of the second or remaining group when the apertures in said feed plate register therewith, and means for receiving the cherries with stems from said delivery means of the second group.

8. Apparatus according to claim 7, in which the plate supporting means includes a plate having two spaced groups of apertures independently connected to the two groups of delivery means.

GIOVANNI FROVA.